(12) United States Patent
Singh et al.

(10) Patent No.: US 11,789,611 B2
(45) Date of Patent: Oct. 17, 2023

(54) METHODS FOR HANDLING INPUT-OUTPUT OPERATIONS IN ZONED STORAGE SYSTEMS AND DEVICES THEREOF

(71) Applicant: NetApp, Inc., Sunnyvale, CA (US)

(72) Inventors: Rohit Shankar Singh, Cary, NC (US); Douglas P. Doucette, San Diego, CA (US); Abhijeet Prakash Gole, Cupertino, CA (US); Prathamesh Deshpande, Folsom, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 16/858,019

(22) Filed: Apr. 24, 2020

(65) Prior Publication Data

US 2021/0334006 A1    Oct. 28, 2021

(51) Int. Cl.
*G06F 3/06* (2006.01)

(52) U.S. Cl.
CPC .......... *G06F 3/0608* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| 5,664,187 | A | 9/1997 | Burkes et al. |
| 6,101,615 | A | 8/2000 | Lyons |
| 8,074,021 | B1 | 12/2011 | Miller et al. |
| 8,463,991 | B2 | 6/2013 | Colgrove et al. |
| 8,549,222 | B1 | 10/2013 | Kleiman et al. |
| 8,775,868 | B2 | 7/2014 | Colgrove et al. |
| 8,832,373 | B2 | 9/2014 | Colgrove et al. |
| 8,850,108 | B1 | 9/2014 | Hayes et al. |
| 8,862,820 | B2 | 10/2014 | Colgrove et al. |
| 9,003,144 | B1 | 4/2015 | Hayes et al. |
| 9,021,297 | B1 | 4/2015 | Hayes et al. |

(Continued)

FOREIGN PATENT DOCUMENTS

EP    1343087 A2    9/2003

OTHER PUBLICATIONS

International Search Report and Written Opinion of the International Searching Authority, dated Aug. 5, 2021.

(Continued)

*Primary Examiner* — Charles Rones
*Assistant Examiner* — Jonah C Krieger
(74) *Attorney, Agent, or Firm* — Troutman Pepper Hamilton Sanders LLP (NetApp)

(57) ABSTRACT

The disclosed technology relates to managing input-output operation in a zoned storage system includes identifying a first physical zone and a second physical zone within a zoned namespace solid-state drive associated with a logical zone to perform a received write operation. Data to be written in the received write operation is temporarily staged in a zone random write area associated with the identified second physical zone. Based a storage threshold of the zone random write area, a determination is made regarding when to transfer temporarily staged data to be written area to the identified second physical zone. When the storage threshold of the zone random write area determined to have exceeded, temporarily staged data to be written is transferred to the identified second physical zone.

18 Claims, 14 Drawing Sheets

(56) References Cited

U.S. PATENT DOCUMENTS

| | | | |
|---|---|---|---|
| 9,134,917 B2 | 9/2015 | Kimmel et al. | |
| 9,201,600 B1 | 12/2015 | Hayes et al. | |
| 9,218,244 B1 | 12/2015 | Hayes et al. | |
| 9,229,808 B2 | 1/2016 | Colgrove et al. | |
| 9,244,769 B2 | 1/2016 | Colgrove et al. | |
| 9,367,243 B1 | 6/2016 | Hayes et al. | |
| 9,483,346 B2 | 11/2016 | Davis et al. | |
| 9,495,255 B2 | 11/2016 | Davis et al. | |
| 9,525,738 B2 | 12/2016 | Hayes et al. | |
| 9,563,506 B2 | 2/2017 | Hayes et al. | |
| 9,588,842 B1 | 3/2017 | Sanvido et al. | |
| 9,594,633 B2 | 3/2017 | Colgrove et al. | |
| 9,672,125 B2 | 6/2017 | Botes et al. | |
| 9,672,905 B1 | 6/2017 | Gold et al. | |
| 9,798,477 B2 | 10/2017 | Botes et al. | |
| 9,880,899 B2 | 1/2018 | Davis et al. | |
| 9,934,089 B2 | 4/2018 | Hayes et al. | |
| 9,967,342 B2 | 5/2018 | Colgrove et al. | |
| 10,095,701 B1 | 10/2018 | Faibish et al. | |
| 10,180,879 B1 | 1/2019 | Colgrove et al. | |
| 10,248,516 B1 | 4/2019 | Sanvido et al. | |
| 10,303,547 B2 | 5/2019 | Hayes et al. | |
| 10,353,777 B2 | 7/2019 | Bernat et al. | |
| 10,372,506 B2 | 8/2019 | Baptist et al. | |
| 10,379,763 B2 | 8/2019 | Colgrove et al. | |
| 10,387,247 B2 | 8/2019 | Baptist et al. | |
| 10,387,250 B2 | 8/2019 | Resch et al. | |
| 10,387,256 B2 | 8/2019 | Dhuse et al. | |
| 10,402,266 B1 | 9/2019 | Kirkpatrick et al. | |
| 10,417,092 B2 | 9/2019 | Brennan et al. | |
| 10,432,233 B1 | 10/2019 | Colgrove et al. | |
| 10,437,673 B2 | 10/2019 | Baptist et al. | |
| 10,437,678 B2 | 10/2019 | Resch | |
| 10,452,289 B1 | 10/2019 | Colgrove et al. | |
| 10,467,107 B1 | 11/2019 | Abrol et al. | |
| 10,489,256 B1 | 11/2019 | Hayes et al. | |
| 10,503,598 B2 | 12/2019 | Trichardt et al. | |
| 10,521,120 B1 | 12/2019 | Miller et al. | |
| 10,530,862 B2 | 1/2020 | Isely et al. | |
| 10,534,661 B2 | 1/2020 | Resch | |
| 10,572,176 B2 | 2/2020 | Davis et al. | |
| 10,579,450 B2 | 3/2020 | Khadiwala et al. | |
| 10,606,700 B2 | 3/2020 | Alnafoosi et al. | |
| 10,613,974 B2 | 4/2020 | Dreier et al. | |
| 10,656,871 B2 | 5/2020 | Peake | |
| 10,657,000 B2 | 5/2020 | Resch | |
| 10,671,480 B2 | 6/2020 | Hayes et al. | |
| RE48,222 E | 9/2020 | Colgrove et al. | |
| 10,776,204 B2 | 9/2020 | Resch et al. | |
| 10,810,083 B1 | 10/2020 | Colgrove et al. | |
| 10,817,375 B2 | 10/2020 | Colgrove et al. | |
| 10,838,834 B1 | 11/2020 | Sanvido et al. | |
| 10,860,424 B1 | 12/2020 | Dhuse et al. | |
| 10,891,192 B1 | 1/2021 | Brennan et al. | |
| RE48,448 E | 2/2021 | Colgrove et al. | |
| 11,269,778 B1 | 3/2022 | Kanteti | |
| 11,340,987 B1 | 5/2022 | Gole et al. | |
| 11,442,646 B2 | 9/2022 | Agarwal | |
| 11,698,836 B2 | 7/2023 | Gole et al. | |
| 2006/0129873 A1 | 6/2006 | Hafner et al. | |
| 2006/0242539 A1 | 10/2006 | Kang et al. | |
| 2010/0332401 A1 | 12/2010 | Prahlad et al. | |
| 2012/0084506 A1 | 4/2012 | Colgrove et al. | |
| 2012/0151118 A1* | 6/2012 | Flynn | G06F 3/0619 711/170 |
| 2014/0281227 A1 | 9/2014 | Herron et al. | |
| 2015/0169244 A1 | 6/2015 | Asnaashari et al. | |
| 2015/0199151 A1 | 7/2015 | Klemm et al. | |
| 2016/0313943 A1 | 10/2016 | Hashimoto et al. | |
| 2016/0342470 A1 | 11/2016 | Cudak et al. | |
| 2017/0124345 A1 | 5/2017 | Christiansen et al. | |
| 2017/0220264 A1* | 8/2017 | Sokolov | G06F 3/061 |
| 2019/0004964 A1 | 1/2019 | Kanno | |
| 2019/0018788 A1 | 1/2019 | Yoshida et al. | |
| 2019/0278663 A1 | 9/2019 | Mehta et al. | |
| 2020/0089407 A1 | 3/2020 | Baca et al. | |
| 2020/0394112 A1 | 12/2020 | Gupta et al. | |
| 2020/0409589 A1 | 12/2020 | Bennett et al. | |
| 2020/0409601 A1 | 12/2020 | Helmick et al. | |
| 2021/0081273 A1 | 3/2021 | Helmick et al. | |
| 2021/0081330 A1* | 3/2021 | Bennett | G06F 3/0679 |
| 2021/0132827 A1 | 5/2021 | Helmick et al. | |
| 2021/0303188 A1* | 9/2021 | Bazarsky | G06F 11/0751 |
| 2021/0334006 A1 | 10/2021 | Singh | |
| 2022/0027051 A1 | 1/2022 | Kant et al. | |
| 2022/0137844 A1 | 5/2022 | Goss et al. | |
| 2022/0197553 A1 | 6/2022 | Benhanokh et al. | |
| 2022/0229596 A1 | 7/2022 | Jung | |
| 2022/0244869 A1 | 8/2022 | Kanteti | |
| 2022/0283900 A1 | 9/2022 | Gole et al. | |
| 2022/0291838 A1 | 9/2022 | Gorobets et al. | |
| 2023/0082636 A1 | 3/2023 | Zhu et al. | |
| 2023/0107466 A1 | 4/2023 | Gole | |
| 2023/0161500 A1 | 5/2023 | Doucette et al. | |
| 2023/0195382 A1 | 6/2023 | Gole et al. | |
| 2023/0195383 A1 | 6/2023 | Gole et al. | |

OTHER PUBLICATIONS

International Preliminary Report on Patentability, dated Oct. 25, 2022.

Dholakia A., et al., "A New Intra-disk Redundancy Scheme for High-Reliability RAID Storage Systems in the Presence of Unrecoverable Errors," ACM Transactions on Storage, May 2008, vol. 4 (1), Article 1, 42 pages.

European Search Report for Application No. EP22157793 dated Jul. 19, 2022, 16 pages.

Mao, B., et al., "HPDA: A Hybrid Parity-Based Disk Array for Enhanced Performance and reliability," ACM Transactions on Storage (TOS), vol. 8, No. 1, Publication [online], Feb. 2012 [retrieved Apr. 4, 2016). Retrieved from the Internet: URL: http://or.nsfc.gov.cn/bitstream/00001903-5/90177/1/1000003549834.pdf , 20 pages.

Mao B., et al., "HPDA: A Hybrid Parity-Based Disk Array for Enhanced Performance and Reliability," Retrieved from Internet URL: https://www.researchgate.net/publication/224140602, May 2020; 13 pages.

Netapp, Inc., "Data ONTAP®7 .3 Data Protection Online Backup and Recovery Guide," Feb. 22, 2011, Part No. 210-05212_A0, 432 pages.

Netapp, Inc., "Data ONTAP®7.3 Active/Active Configuration Guide," Jun. 16, 2011, Part No. 210-05247_A0, 214 pages.

Netapp, Inc., "Data ONTAP®7.3 Archive and Compliance Management Guide," Mar. 4, 2010, Part No. 210-04827_A0, 180 pages.

Netapp, Inc., "Data ONTAP®7.3 Block Access Management Guide for iSCSI and FC," Mar. 4, 2010, Part No. 210-04752_B0, 202 pages.

Netapp, Inc., "Data ONTAP®7.3 Data Protection Tape Backup and Recovery Guide," Jan. 15, 2010, Part No. 210-04762_A0, 142 pages.

Netapp, Inc., "Data ONTAP®7.3 Documentation Roadmap," Jul. 9, 2008, Part No. 210-04229_A0, 8 pages.

Netapp, Inc., "Data ONTAP®7.3 File Access and Protocols Management Guide," Sep. 10, 2009, Part No. 210-04505_B0, 382 pages.

Netapp, Inc., "Data ONTAP®7.3 MultiStore Management Guide," Mar. 4, 2010, Part No. 210-04855_A0, 144 pages.

Netapp, Inc., "Data ONTAP®7.3 Network Management Guide," Jan. 15, 2010, Part No. 210-04757_A0, 222 pages.

Netapp, Inc., "Data ONTAP®7.3 Software Setup Guide," Nov. 4, 2010, Part No. 210-05045_A0, 116 pages.

Netapp, Inc., "Data ONTAP®7.3 Storage Efficiency Management Guide," Mar. 4, 2010, Part No. 210-04856_A0, 76 pages.

Netapp, Inc., "Data ONTAP®7.3 Storage Management Guide," May 3, 2012, Part No. 210-04766_B0, 356 pages.

Netapp, Inc., "Data ONTAP®7.3 System Administration Guide," Nov. 11, 2010, Part No. 210-05043_A0, 350 pages.

Netapp, Inc., "Data ONTAP®7.3 Upgrade Guide," Nov. 11, 2010, Part No. 210-05042_A0, 200 pages.

Netapp, Inc., "Data ONTAP®7.3.7 Release Notes," May 31, 2012, Part No. 215-06916_A0, 182 pages.

(56) References Cited

OTHER PUBLICATIONS

Netapp, Inc., "Date ONTAP®7.3 Core Commands Quick Reference," Jun. 2008, Part No. 215-03893_A0, 1 page.
Netapp, Inc., "Notices," 2010, Part No. 215-05705_A0, 46 pages.
Netapp, Inc., "V-Series Systems Hardware Maintenance Guide," Jul. 2006, Part No. 210-00975_A0, 202 pages.
Netapp, Inc., "V-Series Systems Implementation Guide for Hitachi® Storage," Dec. 2009, Part No. 210-04694_A0, 66 pages.
Netapp, Inc., "V-Series Systems Installation Requirements and Reference Guide," Oct. 2010, Part No. 210-05064_A0, 214 pages.
Netapp, Inc., "V-Series Systems MetroCiuster Guide," Jul. 2009, Part No. 210-04515_A0, 80 pages.
Notice of Allowance for Co-pending U.S. Appl. No. 17/192,606, dated Jan. 28, 2022.
NVM Express Base Specification; Mar. 9, 2020; Revision 1.4a; NVM Express Workgroup; 405 pages.
International Search Report and Written Opinion for Patent Application No. PCT/US2022/049431, dated Mar. 3, 2023, 13 pages.
Non-Final Office Action for Co-pending U.S. Appl. No. 17/650,940 dated Feb. 16, 2023.
Notice of Allowance on co-pending U.S. Appl. No. 16/858,019, dated Dec. 20, 2022, 11 pages.
Notice of Allowance on co-pending U.S. Appl. No. 17/727,511, dated Dec. 14, 2022, 12 pages.
Notice of Allowance dated Apr. 14, 2023 for U.S. Appl. No. 17/727,511, filed Apr. 22, 2022, 2 pages.
Notice of Allowance dated Jun. 1, 2023 for U.S. Appl. No. 17/727,511, filed Apr. 22, 2022, 2 pages.
Non-Final Office Action dated Mar. 30, 2023 for U.S. Appl. No. 17/494,684, filed Oct. 5, 2021, 8 pages.
Non-Final Office Action dated Apr. 18, 2023 for U.S. Appl. No. 17/456,012, filed Nov. 22, 2021, 34 pages.
Non-Final Office Action dated May 15, 2023 for U.S. Appl. No. 17/650,936, filed Feb. 14, 2022, 19 pages.
Notice of Allowance dated Mar. 1, 2023 for U.S. Appl. No. 17/727,511, filed Apr. 22, 2022, 15 pages.
Notice of Allowance dated May 24, 2023 for U.S. Appl. No. 17/727,511, filed Apr. 22, 2022, 2 pages.
Notice of Allowance dated Aug. 3, 2023 for U.S. Appl. No. 17/494,684, filed Oct. 5, 2021, 02 pages.
Notice of Allowance dated Jul. 19, 2023 for U.S. Appl. No. 17/650,940, filed Feb. 14, 2022, 9 pages.
Notice of Allowance dated Jun. 26, 2023 for U.S. Appl. No. 17/494,684, filed Oct. 5, 2021, 8 pages.

* cited by examiner

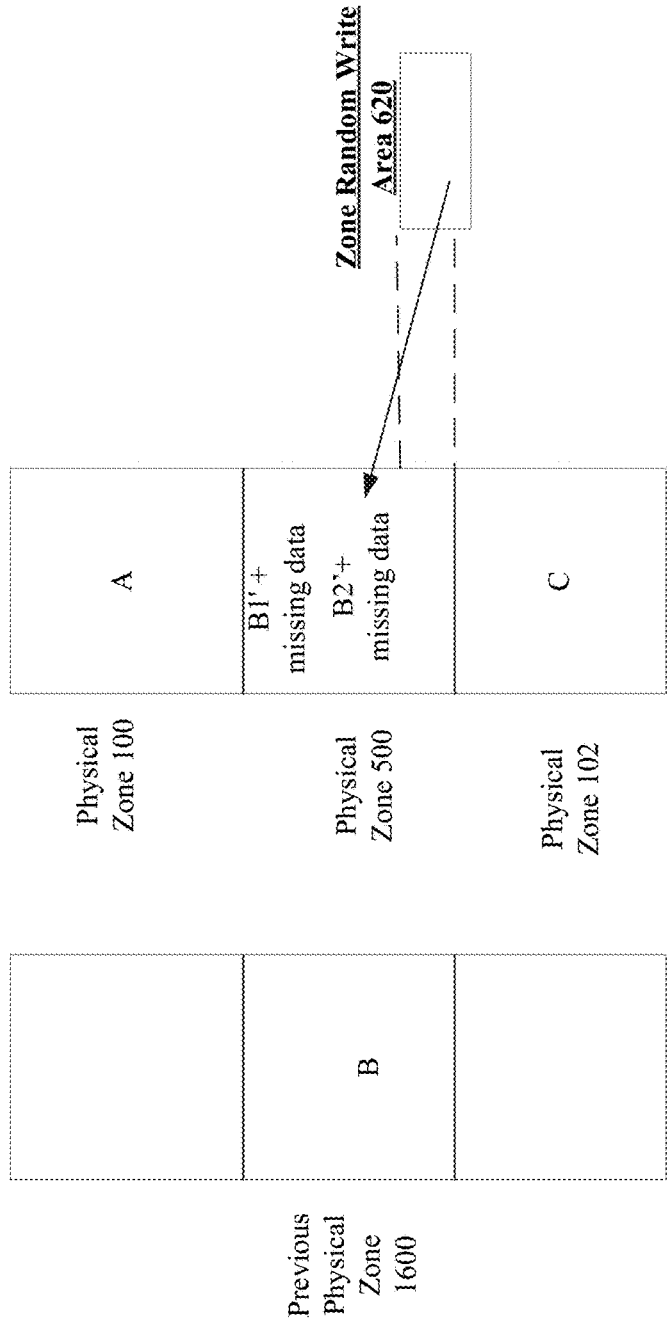

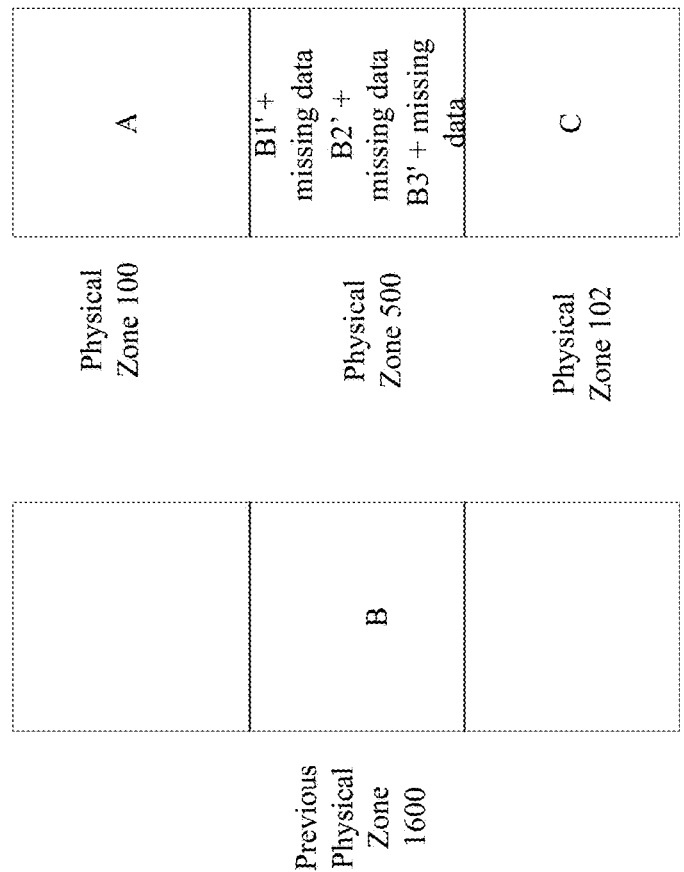

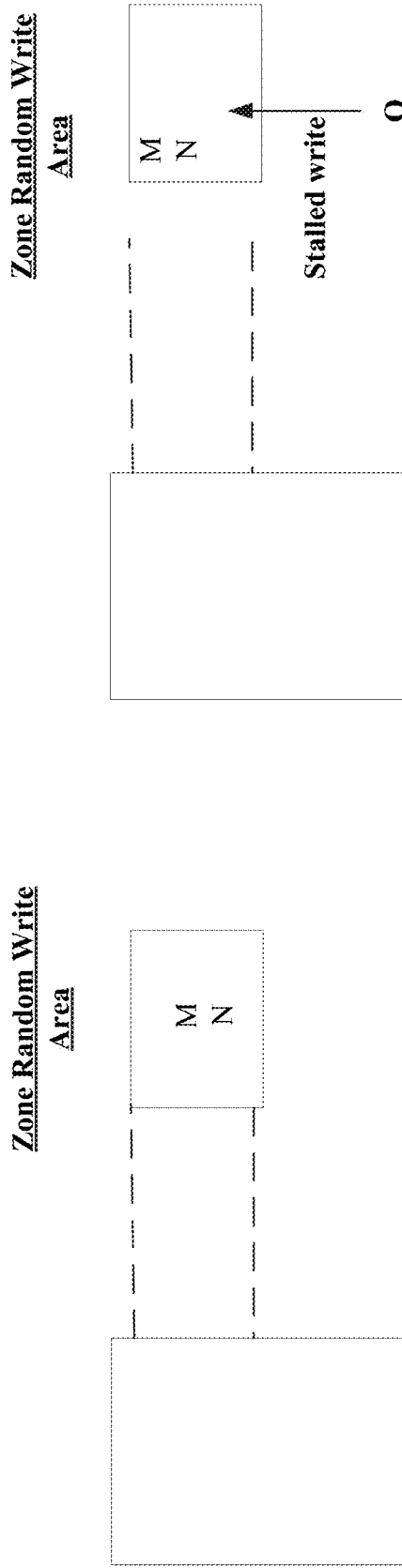
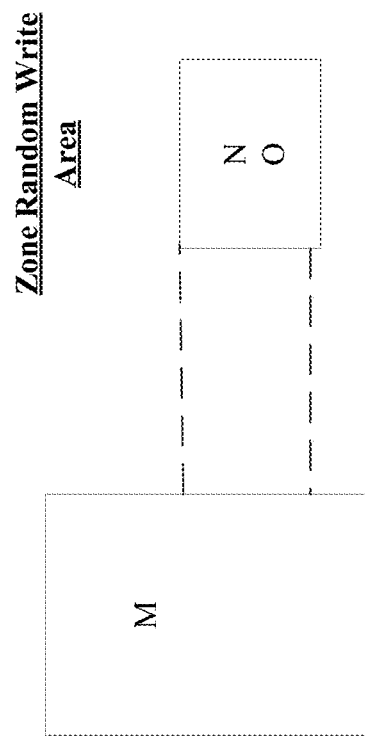
FIG. 8A
FIG. 8B
FIG. 8C

METHODS FOR HANDLING INPUT-OUTPUT OPERATIONS IN ZONED STORAGE SYSTEMS AND DEVICES THEREOF

FIELD

The present technology pertains to the field of storage management, and particularly, directed to a method for handling input-output operations in zoned storage systems and devices.

BACKGROUND

A solid-state drive (SSD) is a data storage device that uses non-volatile solid-state memory to store persistent digitally encoded data. A solid-state drive can be configured to emulate a hard disk drive, i.e., a device that stores persistent digitally encoded data on the magnetic surfaces of rapidly rotating platters, and can be used to replace a hard disk drive in many applications. However, one difference between a solid-state drive and a hard disk drive is that solid-state drives do not have a spinning magnetic platter or actuator arm as used in hard disk drives. Therefore, solid-state drives are more rugged than hard disk drives and do not have the same operational delays.

Unfortunately, one disadvantage associated with a solid-state drive when compared to a hard disk drive is that once an erase block has been programmed with some data, the same erase block cannot be written to again until the erase block has been sequentially erased. To overcome this limitation, modern solid-state drives run complex pieces of software known as flash-translation layers to hide these complications by presenting a uniformly-mutable block interface similar to a hard-drive disk. Unfortunately, this layer requires a significant amount of space to manage its block indirection metadata and garbage collection activities.

BRIEF DESCRIPTION OF THE DRAWINGS

FIGS. 6A-6F are an exemplary block diagrams illustrating a write operation using a zone random write area;

FIGS. 8A-8C is an exemplary block diagram illustrating an implicit commit operation.

DETAILED DESCRIPTION

Figure 1:
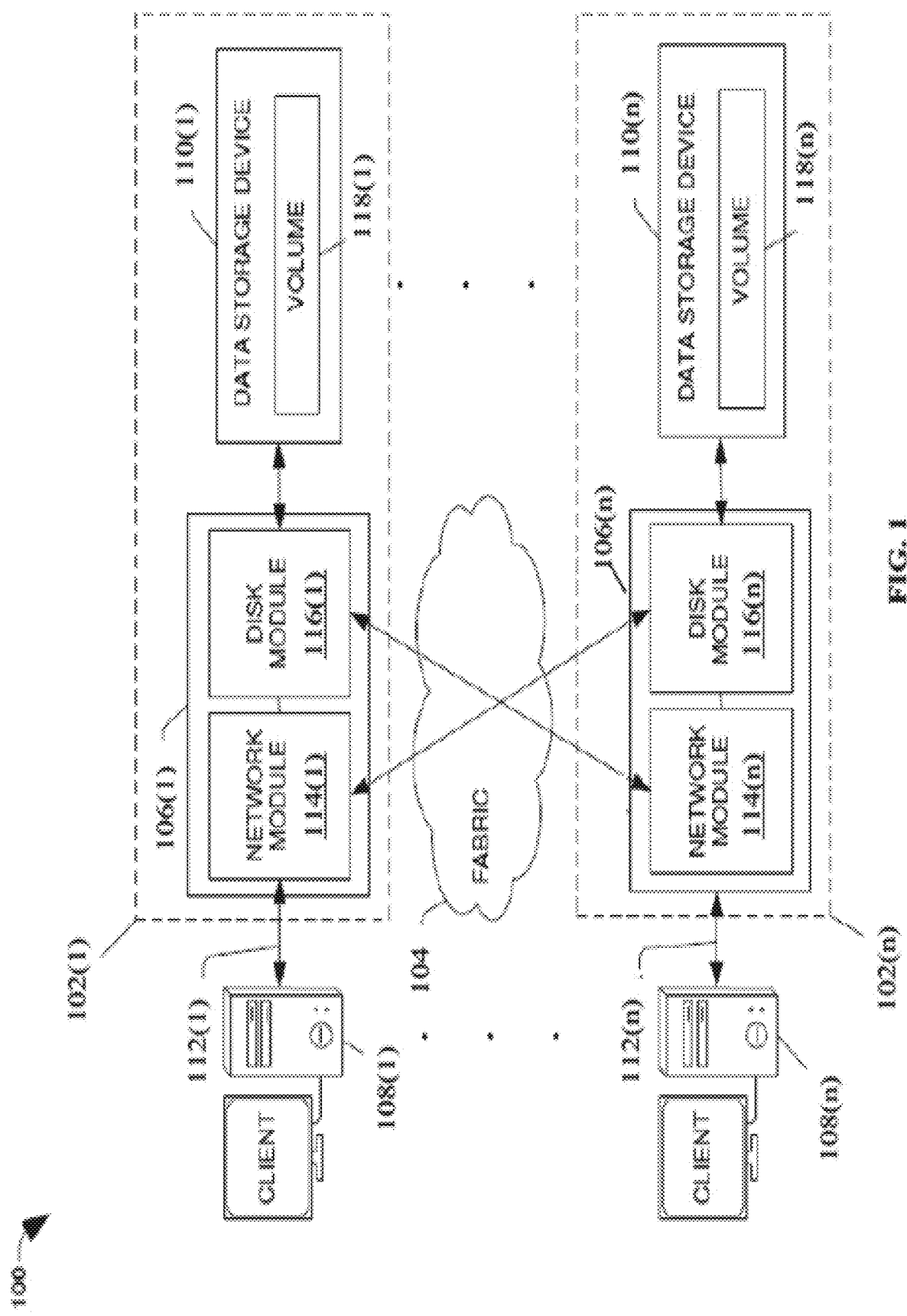
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(*n*) that are coupled over a cluster fabric 104 facilitating communication between the data storage apparatuses 102(1)-102(*n*) (and one or more modules, components, etc. therein, such as, node computing devices 106(1)-106(*n*), for example), although any number of other elements or components can also be included in the clustered network environment 100 in other examples.

This technology provides a number of advantages including methods, non-transitory computer readable media, and devices that more effectively and efficiently handle input-output operations in zoned storage systems. With the disclosed technology, a pair-tuple of physical zones for each logical zone is used to manage the input-output operations. In the disclosed technology, one physical zone represents the logical older copy of the data, whereas the other physical zone represents the logical newer copy of the data. Once the zone has been fully written, the disclosed technology detaches the older physical zone from the logical zone and erasure of the data present in the older physical zone is scheduled so that the older physical zone can be used to perform other input-output operations. Additionally, the disclosed technology uses a zone random write area (or a buffer space) that can be used as a staging buffer to manage random input-output operations so that random input-output operations do not trigger the rewriting or erasing of the data in the access unit of the solid-state drive. By using the techniques illustrated below, the disclosed technology is able to support random input-output operations on the solid-state drives without significant operational delay.

In this example, node computing devices 106(1)-106(*n*) can be primary or local storage controllers or secondary or remote storage controllers that provide client devices 108(1)-108(*n*), with access to data stored within data storage devices 110(1)-110(*n*). The data storage apparatuses 102(1)-102(*n*) and/or node computing device 106(1)-106(*n*) of the examples described and illustrated herein are not limited to any particular geographic areas and can be clustered locally and/or remotely. Thus, in one example the data storage apparatuses 102(1)-102(*n*) and/or node computing device 106(1)-106(*n*) can be distributed over a plurality of storage systems located in a plurality of geographic locations. In another example, a clustered network can include data storage apparatuses 102(1)-102(*n*) and/or node computing device 106(1)-106(*n*) residing in a same geographic location (e.g., in a single onsite rack).

In the illustrated example, one or more of the client devices 108(1)-108(*n*), which may be, for example, personal computers (PCs), computing devices or storage (e.g., storage servers), and other computers or peripheral devices, are coupled to the respective data storage apparatuses 102(1)-102(*n*) by storage network connections 112(1)-112(*n*). Network connections 112(1)-112(*n*) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(*n*) may be general-purpose computers running applications, and may interact with the data storage apparatuses 102(1)-102(*n*) using a client/server model for exchange of information. That is, the client devices 108(1)-108(*n*) may request data from the data storage apparatuses 102(1)-102(*n*) (e.g., data on one of the data storage devices 110(1)-110(*n*) managed by a network storage controller configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices 106 are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to send input-output operations to the node computing devices 106(1)-106(n).

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n) when the node computing device 106(n) is available. Alternatively, when the node computing device 106(n) fails, the network module 114(1) of node computing device 106(1) can access the data storage device 110(n) directly via the cluster fabric 104. The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on either of node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information. In this example, the SSDs in the data storage devices 110(1)-110(n) are arranged in a zoned namespace configuration (where the logical address space of the namespace is divided into zones) where a zone is a portion of the namespace (contiguous LBA range) with specific write access rules.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(*n*), such as providing an ability for volumes 118(1)-118(*n*) to form clusters.

In one example, to facilitate access to data stored on the disks or other structures of the data storage device 110(1)-110(*n*), a file system (e.g., write anywhere file system (WAFL)) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(*n*) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(*n*) can have one or more physical ports, wherein each physical port can be assigned a target address (e.g., SCSI target address). To represent respective volumes, a target address on the data storage devices 110(1)-110(*n*) can be used to identify one or more of the LUNs. Thus, for example, when one of the node computing devices 106(1)-106(*n*) connects to a volume, a connection between the one of the node computing devices 106(1)-106(*n*) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
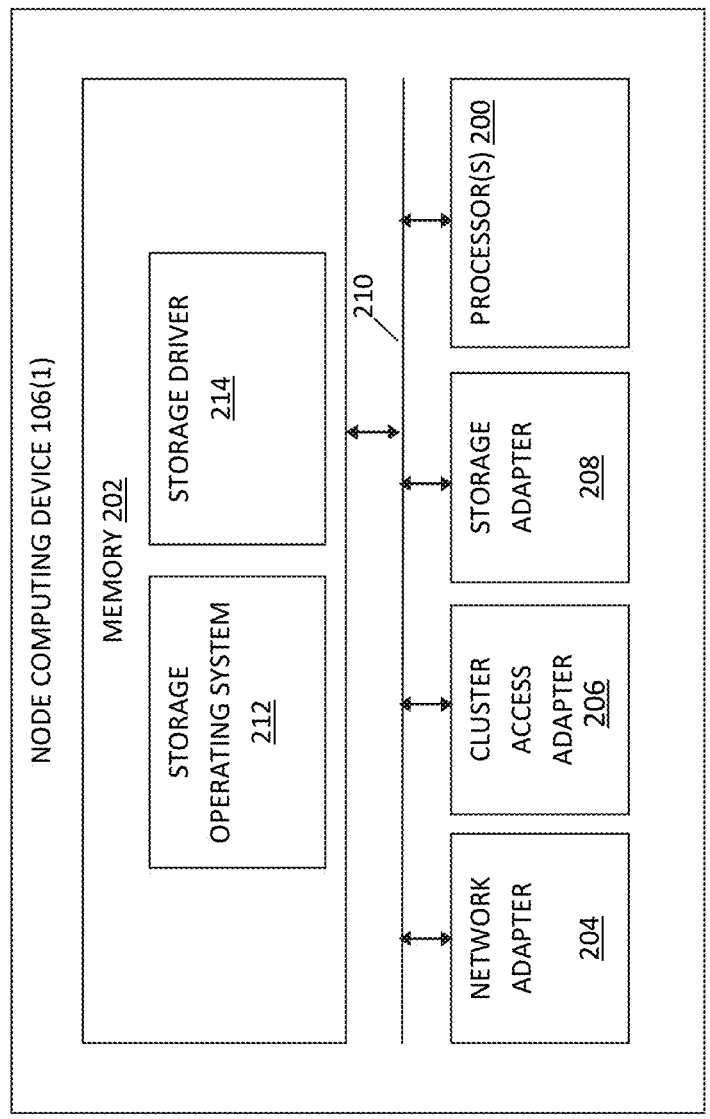
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(*n*) is substantially the same in structure and/or operation as node computing device 106(1), although the node computing device 106(*n*) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(*n*) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-9, for example.

The network adapter 204 in this example includes the mechanical, electrical and signaling circuitry needed to connect the node computing device 106(1) to one or more of the client devices 108(1)-108(*n*) over storage network connections 112(1)-112(*n*), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n), or alternatively sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIGS. 3-9.

Now, an exemplary method for handling input-output operations in zoned storage systems will be illustrated with reference to FIGS. 3-9. Particularly with reference to FIG. 3, an exemplary method for managing a write request begins at step 305 where the node computing device 106(1) receives a data write request from a write anywhere file system (WAFL), although the node computing device 106(1) can receive the write request from one of the client devices 108(1). While this example illustrates the node computing device 106(1) of the node computing devices 106(1)-106(n) performing the steps illustrated in FIGS. 3-9, it is to be understood that other node computing devices of the plurality of node computing devices 106(1)-106(n) can perform the steps illustrated in FIGS. 3-9.

Figure 4:
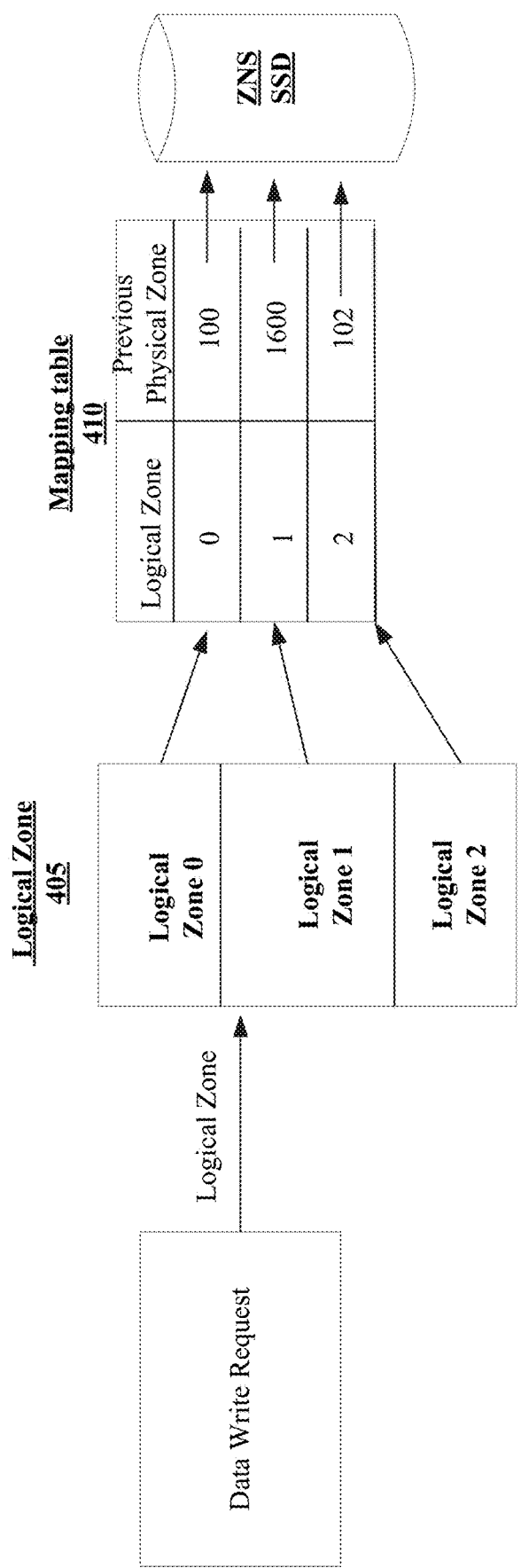
FIG. 4 is an exemplary block diagram illustrating the relation between a logical zone and a physical zone using a mapping table.

In step 310, the node computing device 106(1) identifies a logical zone to write the data within the zoned namespace SSDs within the data storage devices 110(1)-110(n), based on the data present in the write request, although the node computing device 106(1) can identify the logical zone based on the logical block address provided in the received write request. In this example, a logical zone is a portion of the SSD namespace (logical grouping of volumes) with specific write access rules and maps to one or more erase blocks on the SSDs. Additionally in this example, the logical zone is associated with a physical zone where the physical zone is a physical location within the zoned namespace SSDs where data can be read, written, or erased. The mapping of the logical zone and the physical zone is present within the mapping table stored within the memory 202, although the mapping table may be present at other memory locations such as the zoned namespace SSDs. An example step 310 is illustrated in FIG. 4 where the logical zone 405 includes logical zone 0, logical zone 1, and logical zone 2 and a mapping table 410 that includes a mapping of the logical zone to the physical zone that points to the physical location within the zoned namespace SSDs. By way of example, logical zone 0 within the mapping table 410 is associated with the physical zone 100, logical zone 1 is associated with the physical location 1600, and the logical zone 2 is associated with the physical zone 102.

In step 315, the node computing device 106(1) determines if the identified logical zone has a corresponding previous physical zone using the mapping table. As illustrated above, each logical zone generally has a corresponding physical zone assigned and the correlation between the logical zone and the previous physical zone is present within the mapping table. However, when there is no previous physical zone associated with the logical zone, the mapping table would not include the data associated with the previous physical zone. In other words, the mapping table would include a blank for the previous physical zone when there is no previous physical zone associated with the logical zone. Accordingly, if the node computing device 106(1) determines that the identified logical zone does not have a previous physical zone, then the No branch is taken to step 320.

Figure 5:
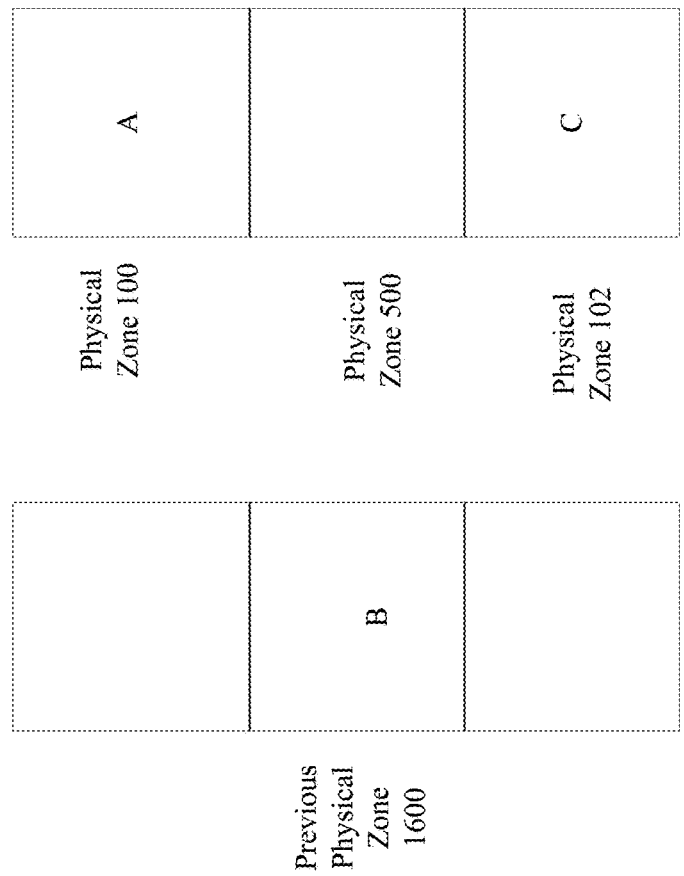
FIG. 5 is an exemplary block diagram illustrating a previous physical zone and a physical zone.

In step 320, the node computing device 106(1) identifies a new empty physical zone from a list of unused physical zones. Additionally, the node computing device 106(1) moves the physical zone that is associated with the logical zone from the mapping table to the previous physical zone column and assigns the identified new physical zone as the physical zone the exemplary flow proceeds to step 325. An example of the step 320 is illustrated in FIG. 5 where there is a previous physical zone 1600 for the identified logical zone and a physical zone 500 is identified from the list of unused physical zones. Additionally, the mapping table 520 in FIG. 5 illustrates the mapping between the logical zones, the previous physical zone, and the physical zone. By way of example, the logical zone 1 correlates to previous physical zone 1600 and the physical zone 500 in the mapping table 520.

Referring back to FIG. 3, back in step 315, if the node computing device 106(1) determines that there is a previous physical zone corresponding to the identified logical zone, then the Yes branch is taken to step 325.

Figure 6A:
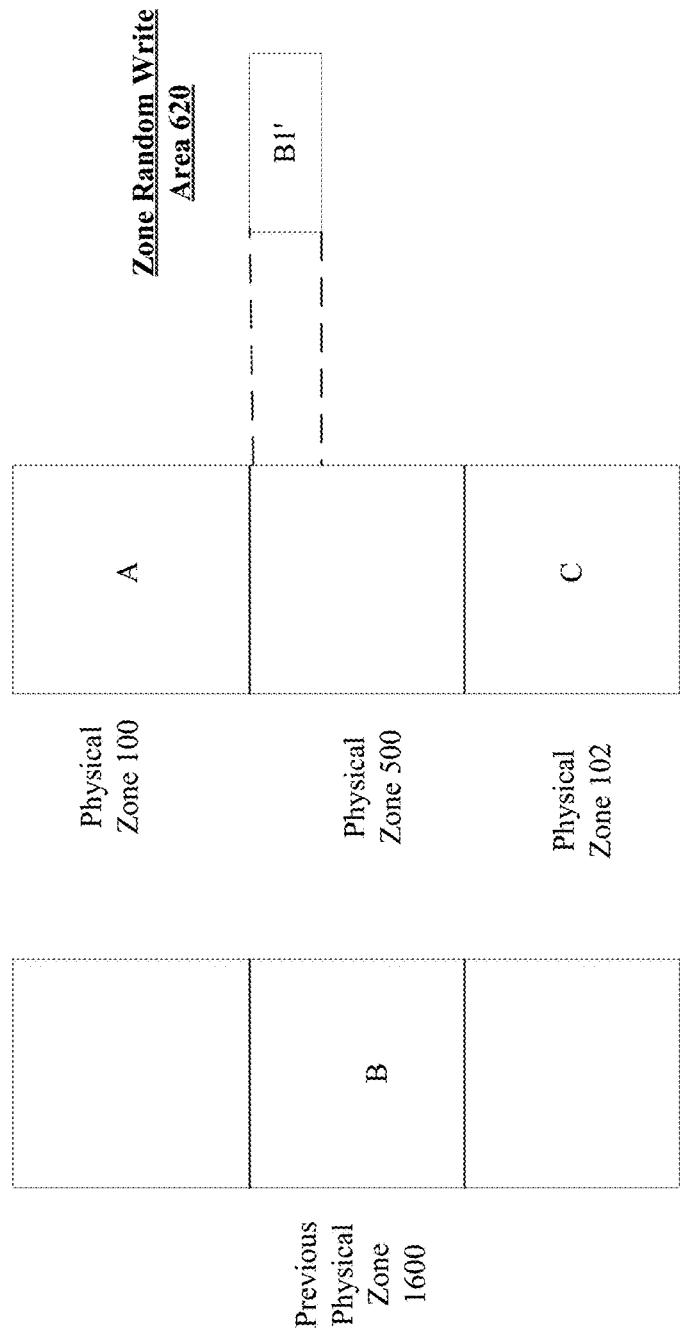

In step 325, the node computing device 106(1) performs the received write operation and the step of performing the received write operation will now be further illustrated with reference to FIG. 6A. First, the node computing device 106(1) temporarily stages the received write operation into a zone random write area that is associated with the physical zone. In this example, the zone random write area assists with temporarily staging the received write data. The size of the zone random write area is substantially smaller when compared to the size of the physical zone as the zone random write area is only there to temporarily stage the received data. Furthermore, the zone random write area is present within the ZNS SSDs, although the zone random write area can be present at other memory locations. Furthermore, the zone random write area might be backed by persistent memory or it might be backed by high-performance NAND flash, by way of example. An example of this step of temporarily staging the received write operation in the zone random write area is illustrated in FIG. 6A. By way of example, if the node computing device 106(1) receives a write operation to write data B1', the node computing device 106(1) temporarily stages the received data in the zone random write area 620 that is associated with the physical zone 500.

Figure 3:
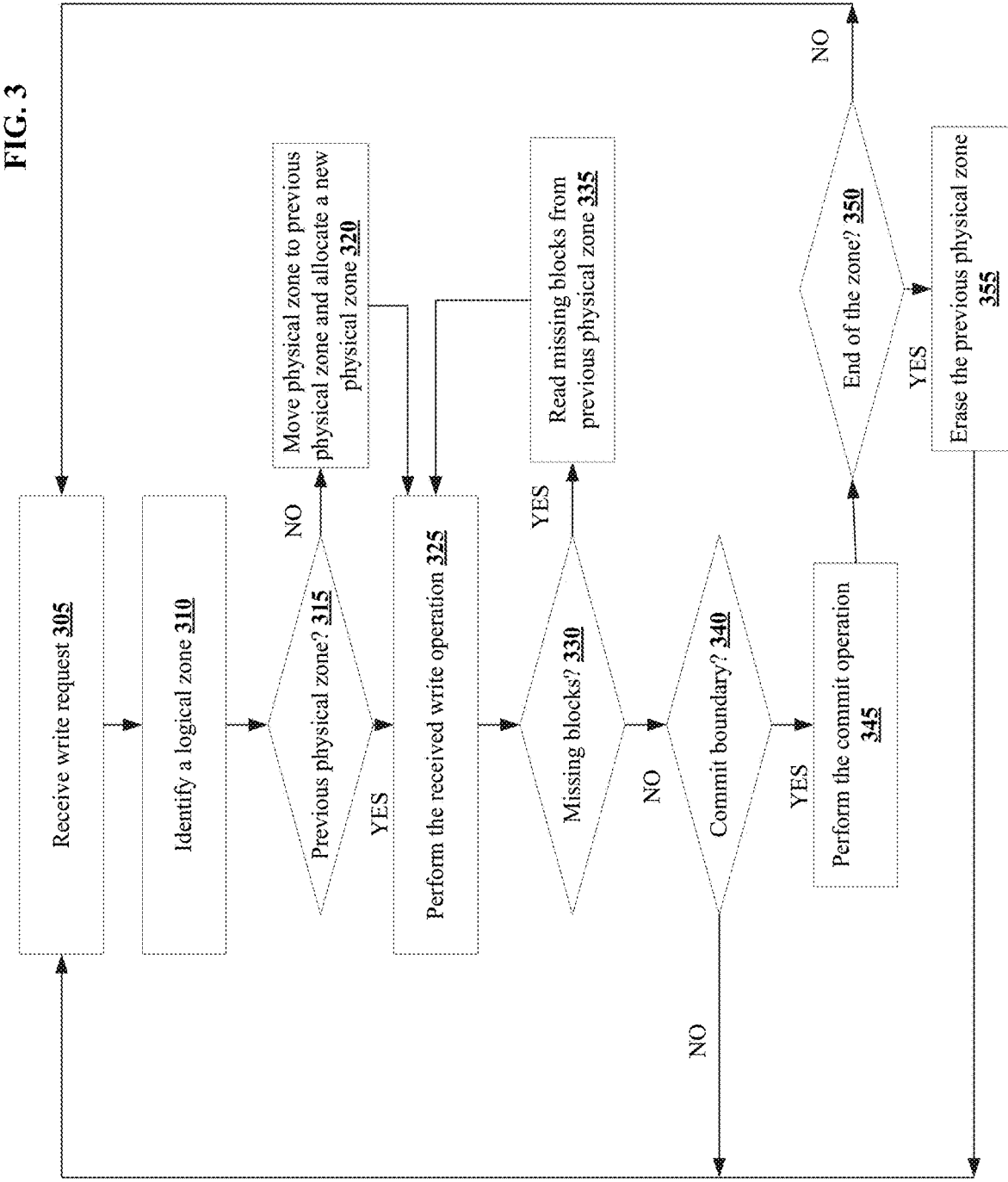
FIG. 3 is a flowchart of an exemplary method for handling write request in a zoned storage system.

Referring to FIG. 3, in step 330, the node computing device 106(1) determines if there are any missing blocks of data in addition to the data that is present in the zone random write area. In this example, a logical zone can include multiple blocks and a block in this example is a smallest memory unit within the logical zone. Accordingly, if the node computing device 106(1) determines that there are missing blocks of data that is to be written, then the Yes branch is taken to step 335.

In step 335, the node computing device 106(1) reads the missing blocks from the previous physical zone associated with the physical zone. An example of this step will now be further illustrated with reference to the mapping table 520 in FIG. 5. In this example, the logical zone 1 is mapping to the previous physical zone 1600 and the physical zone 500. Accordingly, when the node computing device 106(1) determines that there are missing blocks, the node computing device 106(1) will read the missing blocks from the previous physical zone 1600 and the exemplary flow proceeds back to step 325.

Referring to FIG. 3, in step 330, if the node computing device 106(1) determines that there are no missing blocks, then the No branch is taken to step 340. In step 340, the node computing device 106(1) determines if a commit boundary has been reached. In this example, a commit boundary is the threshold capacity of data that can be stored within the zone random write area and is based on the minimum commit size of the underlying device. In this example, the node computing device 106(1) periodically transfers the data from the zone random write area to the corresponding physical zone once the zone random write area has been filled, although the commit boundary is typically smaller than the zone random write area. Accordingly, when the node computing device 106(1) determines that the commit boundary has been reached, then the Yes branch is taken to step 345.

In step 345, the node computing device 106(1) performs the commit operation. In this example, a commit operation relates to a command that carries instructions to transfer the data from the zone random write area to the physical zone. An example of step 345 will be further illustrated with reference to FIG. 6B where the node computing device 106(1) commits the received write data B1' along with the missing data blocks read from the previous physical zone 1600 into the physical zone 500. Additionally in this example, the node computing device advances the zone random write area to point to the next location within the physical zone 500 where the data can be written.

Figure 6B:
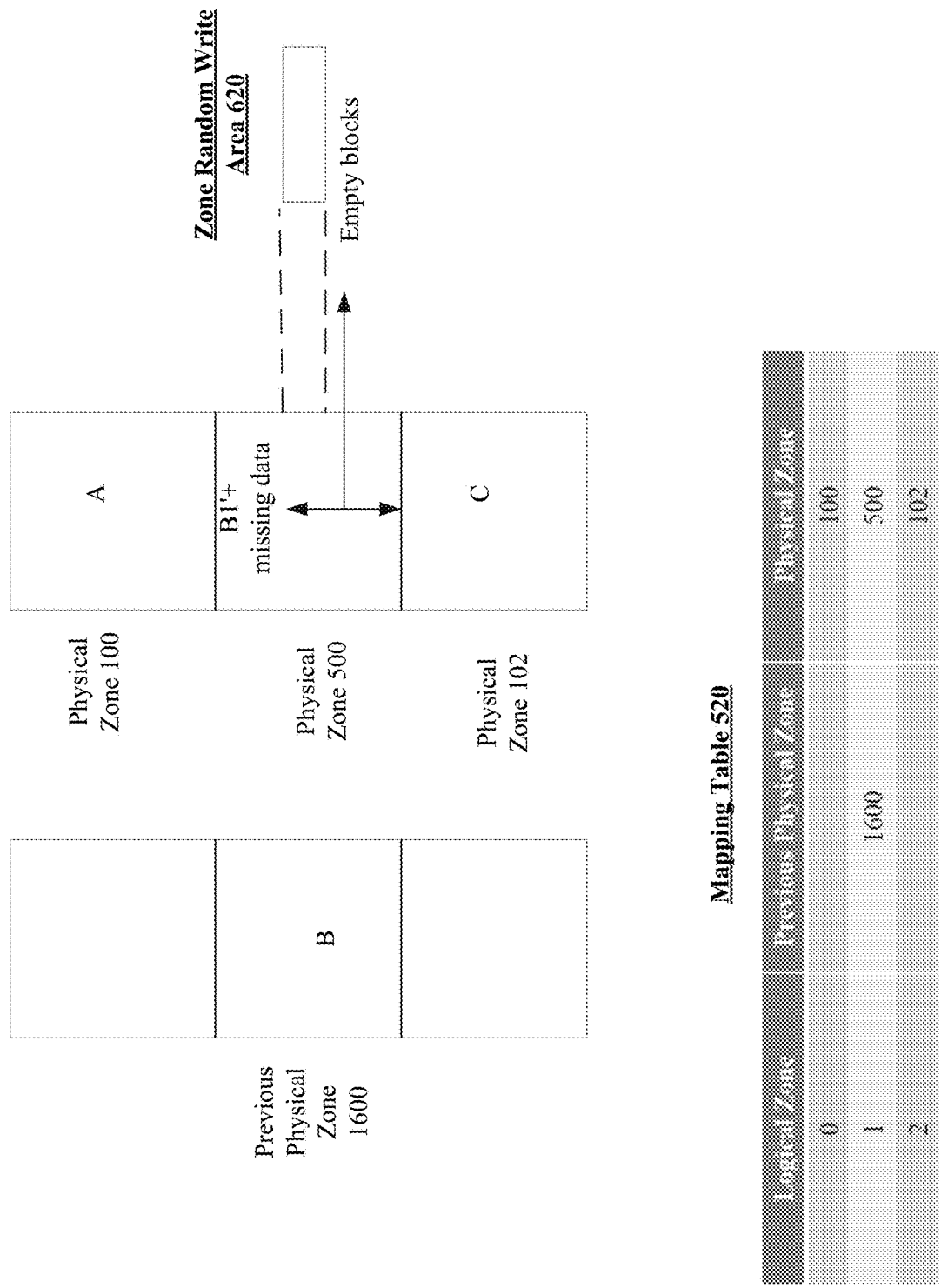
Figure 6C:
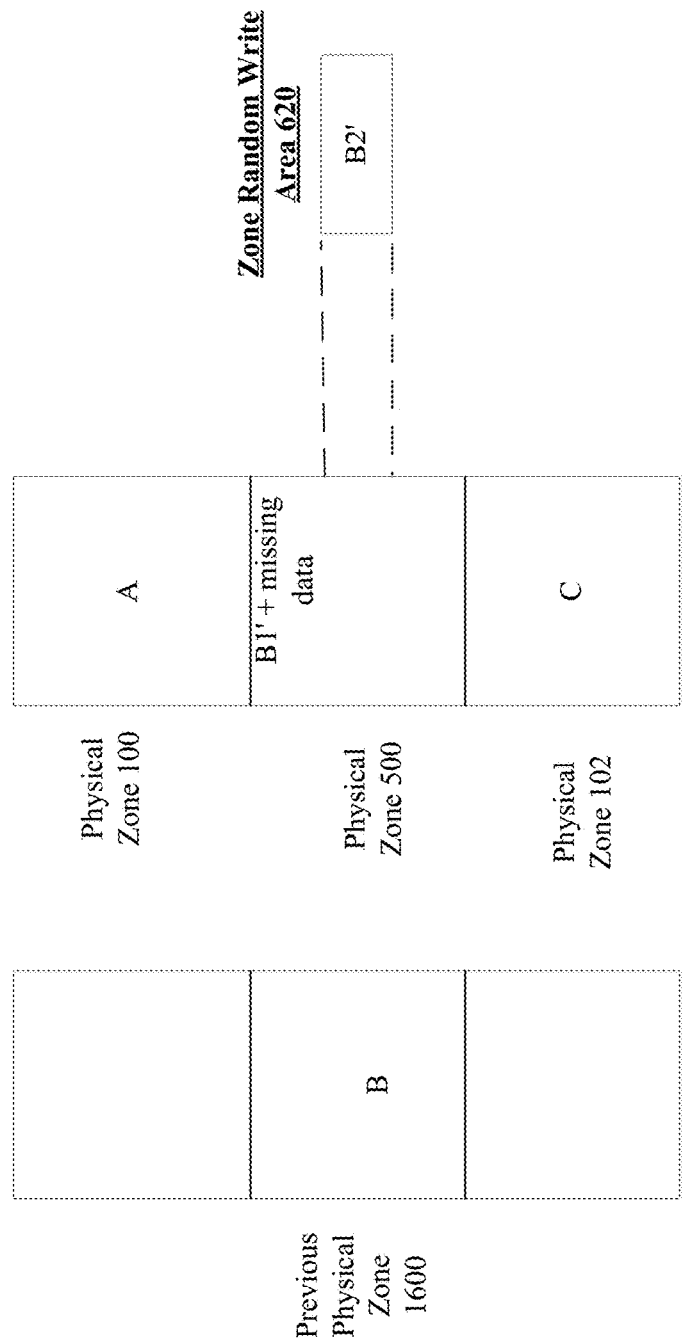

Referring to FIG. 3, in step 350, the node computing device 106(1) determines if the end of the physical zone has been reached after performing the commit operation. As illustrated above, the physical zone includes blocks to which data can be written. When only a portion of the blocks are consumed after commit the data from the zone random write area, there will be remaining blocks that are unwritten and therefore would not have reached the end of the physical zone. An example of this step 350 will now be illustrated with reference to FIG. 6B. As illustrated in FIG. 6B, the node computing device 106(1) commits the data B1' along with the missing data from the zone random write area 620 and only a portion of the blocks within the physical zone 500 are consumed. Accordingly, a portion of the physical zone 500 includes empty blocks and therefore has performing the commit operation has not resulted in reaching the end of the physical zone 500. Referring to FIG. 3, if the node computing device 106(1) determines that it is not the end of the zone, then the No branch is taken to step 305 where subsequent write requests are received. Upon receiving subsequent write requests, steps 310-345 are again performed and an illustrative example will now be described with reference to FIGS. 6C-6E.

Figure 6E:
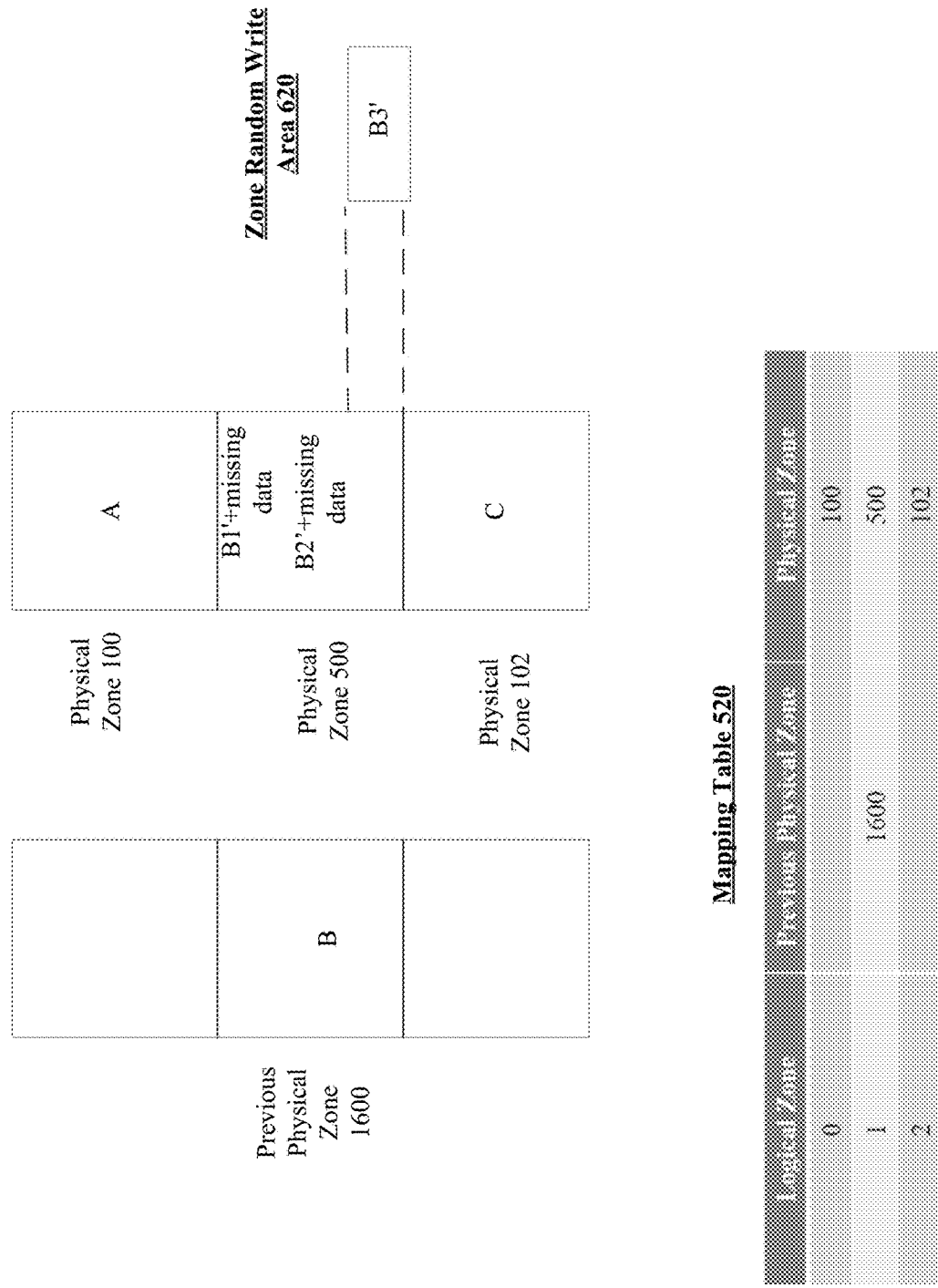

In FIG. 6E, the node computing device 106(1) receives a subsequent write data B2' that is temporarily staged within the zone random write area 620. Additionally, the node computing device 106(1) determines if there are any missing blocks and if there are any missing blocks, then the node computing device 106(1) reads the previous physical zone 1600 for the missing blocks. Eventually, the node computing device 106(1) upon reaching the commit boundary performs the commit operation by transferring the received written data B2' along with the missing data to the physical zone 500 as illustrated in FIG. 6D. Subsequently, the node computing device 106(1) advances the zone random write area 620 to point to the next location where the data can be written as illustrated in FIG. 6D. Further, the node computing device 106 then determines if the end of the zone has been reached and as illustrated in FIG. 6D, there are still empty blocks and therefore the end of the physical zone 500 has not been reached.

Subsequently, the node computing device 106(1) receives another write request to write data B3'. As illustrated above, the received write data B3' is temporarily staged within the zone random write area 620 as illustrated in FIG. 6E. Additionally, the node computing device 106(1) determines if there are any missing blocks and if there are any missing blocks, then the node computing device 106(1) reads the previous physical zone 1600 for the missing blocks. Eventually, the node computing device 106(1) upon reaching the commit boundary performs the commit operation by transferring the received written data B3' along with the missing data to the physical zone 500 as illustrated in FIG. 6F. Again, the node computing device 106(1) determines performing the commit operation has resulted in reaching the end of the zone. As illustrated in FIG. 6F, the node computing device 106(1) after performing the commit operation of B3' along with the missing data has resulted in reaching the end of the physical zone 500.

Figure 7:
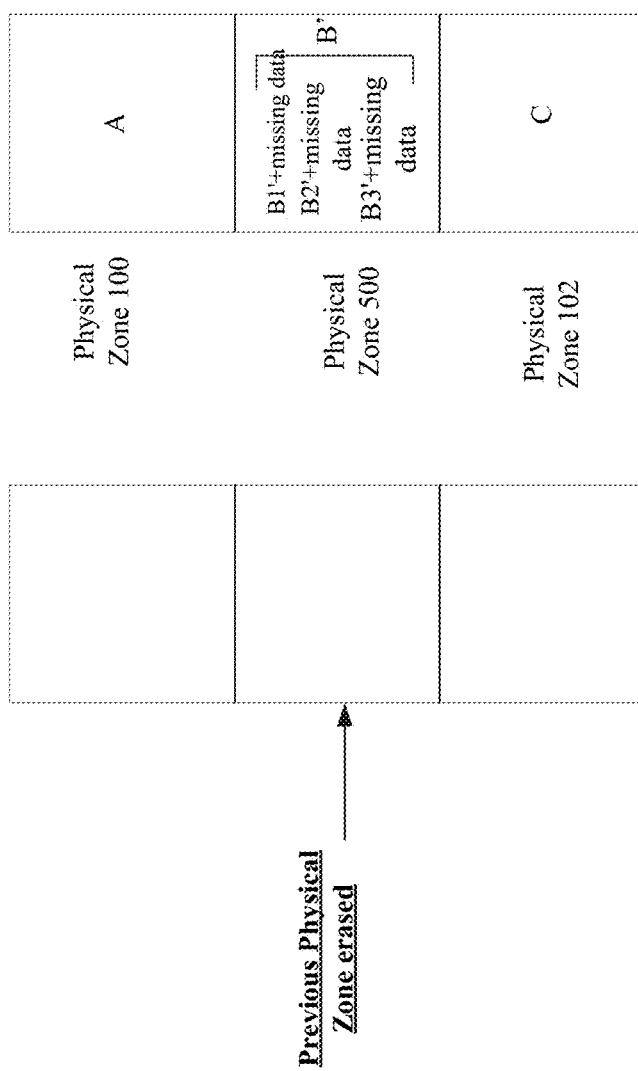
FIG. 7 is an exemplary block diagram illustrating erasing of data in the previous physical zone.

Referring to FIG. 3, if in step 350, the node computing device 106(1) determines that the end of the zone is reached, then the Yes branch is taken to step 355. In step 355, the node computing device 106(1) erases the data in previous physical zone associated with the identified logical zone. Additionally, the node computing device 106(1) updates the mapping table to delete the reference to the previous physical zone. An example of step 350 will be illustrated with reference to FIG. 7. As illustrated in FIG. 7, the node computing device 106(1) erases the data present in the previous physical zone and deletes the entry in to mapping table 520. Once erased, physical zone 1600 will be available for subsequent reuse. The exemplary flow proceeds back to step 305 where subsequent write requests are received.

While step 345 and FIGS. 6B, 6D, and 6F illustrates one example of an explicit commit operation, an alternative commit operation, i.e., implicit commit, will now be illustrated with reference to FIG. 8A-8B. An example in FIG. 8A illustrates the zone random write area including data M and N to be written to the physical zone in the ZNS SSD on a solid-state drive that supports implicit commit. In FIG. 8A, the zone random write area is 4 blocks and the minimum commit size is 2 blocks. By temporarily staging the data M and N within the zone random write area, the zone random write area has reached its window size (or the threshold capacity). Accordingly, when the zone random write area receives subsequent data O to be written beyond the boundary of the zone random write area as illustrated in FIG. 8B, the subsequent data is temporarily stalled before writing to the zone random write area. Next, the node computing device 106(1) implicitly commits or transfers data M to the physical zone, moves the write pointer by the minimum commit size, and then temporarily stages the stalled write data O into the zone random write area as illustrated in FIG. 8C.

Figure 9:
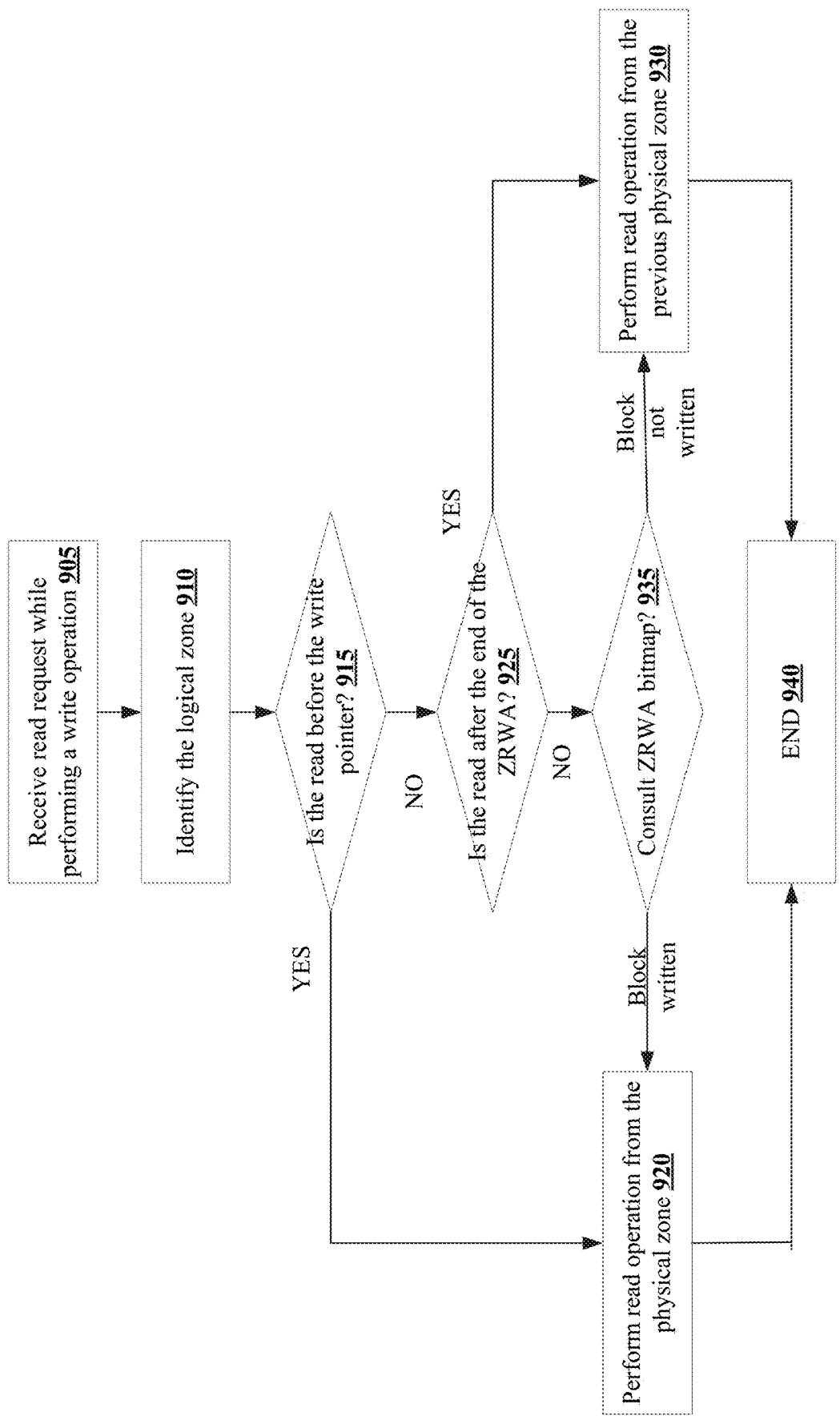
FIG. 9 is flowchart of an exemplary method for handling a read operation while performing a write operation in the zone storage system.

An exemplary method for managing a read request in zoned storage systems will be illustrated with reference to the exemplary flowchart in FIG. 9. In step 905, the node computing device 106(1) receives a read request from the write anywhere file system, although the node computing device 106(1) can receive the read request one of the client devices 108(1) while performing a previously received write operation using the technique illustrated above. In this example, the received read request includes the logical zone where the data is present, although the data read request can include other types and/or amounts of information such as the logical block address from where the data is to be read.

In step 910, the node computing device 106(1) identifies the logical zone and the corresponding previous physical zone along with the physical zone using the mapping table stored within the memory 206, although the node computing device 106(1) can use other techniques to identify the physical zone. In this example, the mapping table is used to map the logical zone to the corresponding previous physical zone and the physical zone.

In step 915, the node computing device 106(1) determines if the received read request is before the current position of a write pointer of the physical zone where the write pointer indicates the current position within the physical zone where the data is to be committed when destaged from the zone random write area. Accordingly, when the node computing device 106(1) determines that the received read operation is before the write pointer, then the Yes branch is taken to step 920.

In step 920, the node computing device 106(1) reads the requested data from the physical zone, provides it to the requesting client device 108(1) and the exemplary method ends at step 940.

However, back in step 915, if the node computing device 106(1) determines that the received read request is not before the write pointer, then the No branch is taken to step 925. In step 925, the node computing device 106(1) determines if the received read request is after the end of the zone random write area. As illustrated above in FIGS. 6A-6F, the start of the zone random write area is at a location where the data can be next committed to in the physical zone. In other words, the position before the zone random write area is where the data has been transferred to the physical zone and the position after the start of the zone random write area is where the data can be written. Accordingly, when the node computing device 106(1) determines that the read is after the end of the zone random write area, then the Yes branch is taken to step 930.

In step 930, the node computing device 106(1) performs the read operation from the previous physical zone and the exemplary flow proceeds to step 940 where the exemplary method ends.

However, back in step 925, if the node computing device 106(1) determines that the read is not after the end of the zone random write area, then the No branch is taken to step 935. In step 935, the node computing device 106(1) refers to zone random write area bitmap which includes the data associated with whether the data block within the zone has been written to the zone random write area. Accordingly, if the node computing device 106(1) determines that the data block has been written, then the exemplary flow proceeds to step 920 where the read operation is performed from the block that is written in the physical zone and will implicitly retrieve the data from the zone random write area attached to the physical zone. However, when the node computing device from the zone random write area determines that the block has not been written, then the exemplary flow proceeds to step 930 where the read operation is performed by the previous physical zone and the exemplary method ends at step 940.

Accordingly, as illustrated and described by way of the examples here, the above illustrated technology uses a pair-tuple of physical zones for each logical zone is used to manage the input-output operations. In the disclosed technology, one physical zone represents the logical older copy of the data, whereas the other physical zone represents the logical newer copy of the data. Once the zone has been fully written, the disclosed technology detaches the older physical zone from the logical zone and erasure of the data present in the older physical zone is scheduled so that the older physical zone can be used to perform other input-output operations. Additionally, the disclosed technology uses a zone random write area (or a buffer space) that can be used as a staging buffer to manage random input-output operations so that random input-output operations do not trigger the rewriting or erasing of the data in the access unit of the solid-state drive. By using the techniques illustrated above, the disclosed technology can support random input-output operations on the solid-state drives without significant operational delay.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:

identifying, by a computing device, in response to a received write operation a first physical zone and a second physical zone that are within a zoned namespace solid-state drive and mapped to a logical zone, wherein the first physical zone comprises a copy of an older version of data and the second physical zone comprises another copy of a newer version of the data;

temporarily staging, by the computing device, other data to be written as a result of the received write operation in a zone random write area associated with the identified second physical zone, wherein the temporarily staged other data includes missing data read from the first physical zone;

transferring, by the computing device, the temporarily staged other data to the identified second physical zone when a storage threshold of the zone random write area is determined to have been reached to perform a commit operation; and erasing, by the computing device, the older version of the data from the first physical zone, when an end of the second physical zone is determined to have been reached subsequent to the commit operation, in order to make the first physical zone available for reuse.

2. The method as set forth in claim 1, further comprising destaging, by the computing device, the zone random write area after transferring the temporarily staged other data.

3. The method as set forth in claim 1, further comprising servicing, by the computing device, a request to read additional data from the identified first physical zone, when the request to read the additional data is referenced to a location beyond a current location of the zone random write area, and from the identified second physical zone, when the request to read the additional data is referenced to another location before the current location of the zone random write area.

4. The method as set forth in claim 1, further comprising transferring, by the computing device, the temporarily staged other data to the identified second physical zone upon receipt of a commit command.

5. A non-transitory machine readable medium having stored thereon instructions comprising machine executable code which when executed by at least one machine causes the machine to:
identify in response to a received write operation a first physical zone and a second physical zone that are within a zoned namespace solid-state drive and mapped to a logical zone, wherein the first physical zone comprises a copy of an older version of data and the second physical zone comprises another copy of a newer version of the data;
temporarily stage other data to be written as a result of the received write operation in a zone random write area associated with the identified second physical zone, wherein the temporarily staged other data includes missing data read from the first physical zone;
transfer the temporarily staged other data to the identified second physical zone when a storage threshold of the zone random write area is determined to have been reached to perform a commit operation; and
erase the older version of the data from the first physical zone, when an end of the second physical zone is determined to have been reached subsequent to the commit operation, in order to make the first physical zone available for reuse.

6. The non-transitory machine readable medium as set forth in claim 5, wherein the machine executable code, when executed by the at least one machine, further causes the machine to destage the zone random write area after transferring the temporarily staged other data.

7. The non-transitory machine readable medium as set forth in claim 5, wherein the machine executable code, when executed by the at least one machine, further causes the machine to service a request to read additional data from the identified first physical zone, when the request to read the additional data is referenced to a location beyond a current location of the zone random write area, and from the identified second physical zone, when the request to read the additional data is referenced to another location before the current location of the zone random write area.

8. The non-transitory machine readable medium as set forth in claim 5, wherein the machine executable code, when executed by the at least one machine, further causes the machine to transfer the temporarily staged other data to the identified second physical zone upon receipt of a commit command.

9. A computing device, comprising:
a memory containing machine readable medium comprising machine executable code having stored thereon instructions for managing workload within a storage system; and
a processor coupled to the memory, the processor configured to execute the machine executable code to cause the processor to:
identify in response to a received write operation a first physical zone and a second physical zone that are within a zoned namespace solid-state drive and mapped to a logical zone, wherein the first physical zone comprises a copy of an older version of data and the second physical zone comprises another copy of a newer version of the data;
temporarily stage other data to be written as a result of the received write operation in a zone random write area associated with the identified second physical zone, wherein the temporarily staged other data includes missing data read from the first physical zone;
transfer the temporarily staged other data to the identified second physical zone when a storage threshold of the zone random write area is determined to have been reached to perform a commit operation; and
erase the older version of the data from the first physical zone, when an end of the second physical zone is determined to have been reached subsequent to the commit operation, in order to make the first physical zone available for reuse.

10. The computing device as set forth in claim 9, wherein the processor is further configured to execute the machine executable code to further cause the processor to destage the zone random write area after transferring the temporarily staged other data.

11. The computing device as set forth in claim 9, wherein the processor is further configured to execute the machine executable code to further cause the processor to service a request to read additional data from the identified first physical zone, when the request to read the additional data is referenced to a location beyond a current location of the zone random write area, and from the identified second physical zone, when the request to read the additional data is referenced to another location before the current location of the zone random write area.

12. The computing device as set forth in claim 9, wherein the processor is further configured to execute the machine executable code to further cause the processor to transfer the temporarily staged other data to the identified second physical zone upon receipt of a commit command.

13. The computing device as set forth in claim 11, wherein the processor is further configured to execute the machine executable code to further cause the processor to determine when to service the request to read the additional data from the identified first physical zone or the identified second physical zone based on a bitmap data associated with the zone random write area.

14. The computing device as set forth in claim 11, wherein the request to read the additional data is received while performing the received write operation.

15. The method as set forth in claim 3, further comprising determining, by the computing device, when to service the request to read the additional data from the identified first physical zone or the identified second physical zone based on a bitmap data associated with the zone random write area.

16. The method as set forth in claim 3, wherein the request to read the additional data is received while performing the received write operation.

17. The non-transitory machine readable medium as set forth in claim 7, wherein the machine executable code, when executed by the at least one machine, further causes the machine to service the request to read the additional data from the identified first physical zone or the identified second physical zone based on a bitmap data associated with the zone random write area.

18. The non-transitory machine readable medium as set forth in claim 7, wherein the request to read the additional data is received while performing the received write operation.

* * * * *